United States Patent
Traeber

(10) Patent No.: US 7,957,283 B2
(45) Date of Patent: Jun. 7, 2011

(54) MULTI-PORT ETHERNET TRANSCEIVER

(75) Inventor: Mario Traeber, Pliening (DE)

(73) Assignee: Lantiq Deutschland GmbH, Neubiberg (DE)

( * ) Notice: Subject to any disclaimer, the term of this patent is extended or adjusted under 35 U.S.C. 154(b) by 179 days.

(21) Appl. No.: 12/145,119

(22) Filed: Jun. 24, 2008

(65) Prior Publication Data

US 2009/0316718 A1   Dec. 24, 2009

(51) Int. Cl.
H04J 3/00 (2006.01)
H04L 12/66 (2006.01)

(52) U.S. Cl. ......... 370/230; 370/235; 370/445; 370/463

(58) Field of Classification Search .......................... None
See application file for complete search history.

(56) References Cited

U.S. PATENT DOCUMENTS

| | | | |
|---|---|---|---|
| 6,108,306 A * | 8/2000 | Kalkunte et al. | 370/235 |
| 6,201,486 B1 * | 3/2001 | Chan et al. | 341/61 |
| 6,385,208 B1 * | 5/2002 | Findlater et al. | 370/419 |
| 2002/0083233 A1 * | 6/2002 | Owen et al. | 710/60 |
| 2004/0008713 A1 * | 1/2004 | Knight et al. | 370/428 |
| 2004/0073695 A1 * | 4/2004 | Robertson | 709/232 |
| 2005/0013252 A1 * | 1/2005 | Ono et al. | 370/235 |
| 2005/0243856 A1 | 11/2005 | Mishra et al. | |
| 2007/0288604 A1 * | 12/2007 | Achtermann et al. | 709/220 |

OTHER PUBLICATIONS

"VSC7388, SparX-G8—8-port Integrated Gigabit Ethernet Switch SoC with Copper PHYs," Vitesse, www.vitesse.com, 1 page.
"ET2005-40, Gigabit Ethernet Five-Port Switch and PHY," Agere Systems, Product Brief, Feb. 2006, pp. 1-4.
"BCM5400 100/1000Base-T Gigabit Ethernet Transceiver," BCM5400 Product Brief, Broadcom, www.broadcom.com, 2 pages.
"Gigabit Ethernet over Copper," CSD Magazine, Aug. 1998, http://www.commsdesign.com/main/9808fe1,htm, 7 pages.
"Marvell Alaska 88EIII, Single Port Gigabit Ethernet Transceiver, "Marvell Semiconductor, Inc., www.marvell.com, 2 pages.
"Ethernet IP, Serial Gigabit Media Independent Interface, M-SGMII," Mentor Graphics, www.mentor.com/ip, 2 pages.
"Gigabit Ethernet PHY Chip Sets LAN Speed Record for CopperStory", Electronic Design, Nov. 16, 1998, http://electronicdesign.com/Globals/Planet EE/Content/2706.htm, 6 pages.

* cited by examiner

Primary Examiner — Chi H Pham
Assistant Examiner — Soon-Dong D Hyun
(74) Attorney, Agent, or Firm — Coats & Bennett, P.L.L.C.

(57) ABSTRACT

According to one embodiment, an Ethernet physical interface transceiver comprises a link interface configured to be segmented into one or more active ports. First circuitry is configured to transmit and receive data either at a relatively high data rate via a single active port of the link interface when the transceiver is configured in a first mode or at a relatively low data rate via at least two different active ports of the link interface when the transceiver is configured in a second mode. Second circuitry is configured to communicate with a media access controller either at a relatively high data rate when the transceiver is configured in the first mode or at a relatively low data rate when the transceiver is configured in the second mode. Clock circuitry is configured to independently synchronize operation of each active port of the link interface.

25 Claims, 7 Drawing Sheets

MULTI-PORT ETHERNET TRANSCEIVER

BACKGROUND

Ethernet transceivers include a PHY entity for implementing the physical layer (PHY layer) of the OSI (Open Systems Interconnection) networking communication model. The performance level of Ethernet PHYs has steadily increased over the years from 10 Mbps (10Base-T) and 100 Mbps (Fast Ethernet) to 1000 Mbps (Gigabit Ethernet) and 10 Gbps (10-Gigabit Ethernet) and above. Gigabit Ethernet PHYs typically have several transmit and receive sections coupled to a link interface. The link interface conventionally provides a single port that serves as an interface between the PHY transmit and receive sections and cabling connected to the PHY. All transmit and receive sections of a Gigabit Ethernet PHY operate concurrently to provide full-duplex operation at 1000 Mbps when the port is coupled to cabling having 1000 Mbps capacity or greater such as Category-5 (CAT-5) or Category-6 (CAT-6) type copper cabling.

SUMMARY

According to the methods and apparatus taught herein, an Ethernet physical interface transceiver comprises a link interface configured to be segmented into one or more active ports. First circuitry is configured to transmit and receive data either at a relatively high data rate via a single active port of the link interface when the transceiver is configured in a first mode or at a relatively low data rate via at least two different active ports of the link interface when the transceiver is configured in a second mode. Second circuitry is configured to communicate with a media access controller either at a relatively high data rate when the transceiver is configured in the first mode or at a relatively low data rate when the transceiver is configured in the second mode. Clock circuitry is configured to independently synchronize operation of each active port of the link interface.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
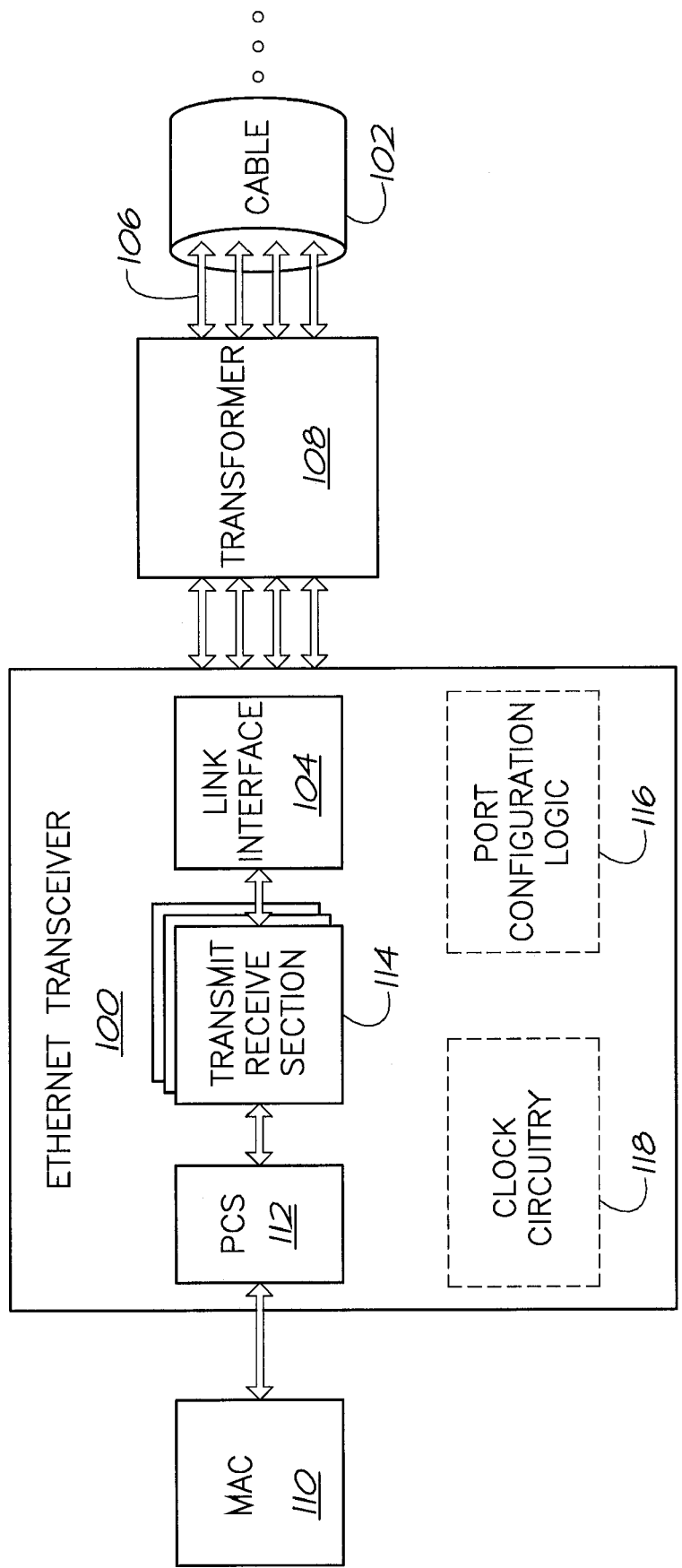
FIG. 1 is a block diagram of an embodiment of an Ethernet transceiver.

FIG. 1 illustrates an embodiment of an Ethernet transceiver 100. The transceiver 100 is connected to cabling 102 via a link interface 104 and enables physical layer signaling with a device (not shown) coupled to the transceiver 100 at the far end of the cabling 102. The cabling 102 may include one or more twisted-pair links 106 for carrying data between the transceiver 100 and the far end device. In one embodiment, a transformer 108 electromagnetically couples each twisted-pair link 106 to the link interface 104. The transceiver 100 is also coupled to a MAC (media access controller) 110 which provides data link layer functionality (i.e., layer-2 of the OSI model). During transmit operations, the MAC 110 sends data frames to the transceiver 100. PCS (physical coding sublayer) logic 112 included in the transceiver 100 encodes the data frames into symbols. The transmitter 100 has a plurality of transmit and receive circuit sections 114 for transmitting the symbols via the link interface 104 to the far end device over the cabling 102. Conversely, the transceiver 100 receives symbols from the far end device during receive operations. The transmit and receive circuit sections 114 decode the symbols and the PCS logic 112 sends the decoded data from the transceiver 100 to the MAC 110 as frames for higher-layer processing.

The link interface 104 included in the Ethernet transceiver 100 can be logically segmented into one port to communicate with a single far end device coupled to the transceiver 100 or at least two different ports to communicate with multiple far end devices. This way, at least two different lower-performance (lower data rate) Ethernet devices (e.g., 100 Mbps or 10 Mbps) can be coupled to the same transceiver 100. The transceiver 100 includes port configuration logic 116 for segmenting the link interface 104 into one or more data ports based on the number of far end devices coupled to the transceiver 100, e.g., as illustrated by Step 200 of FIG. 2. The port configuration logic 116 determines whether one or more far end devices are coupled to the transceiver 100, e.g., as illustrated by Step 202 of FIG. 2. In one embodiment, the number of far end devices coupled to the transceiver 100 can be determined via an auto-negotiation process carried out between the transceiver 100 and each far end device. Alternatively, far end device information can be provided to the transceiver 100 via higher-layer signaling, e.g., from the MAC 110. In still another embodiment, the transceiver 100 can be programmed to accommodate a predetermined number of far end devices.

Figure 2:
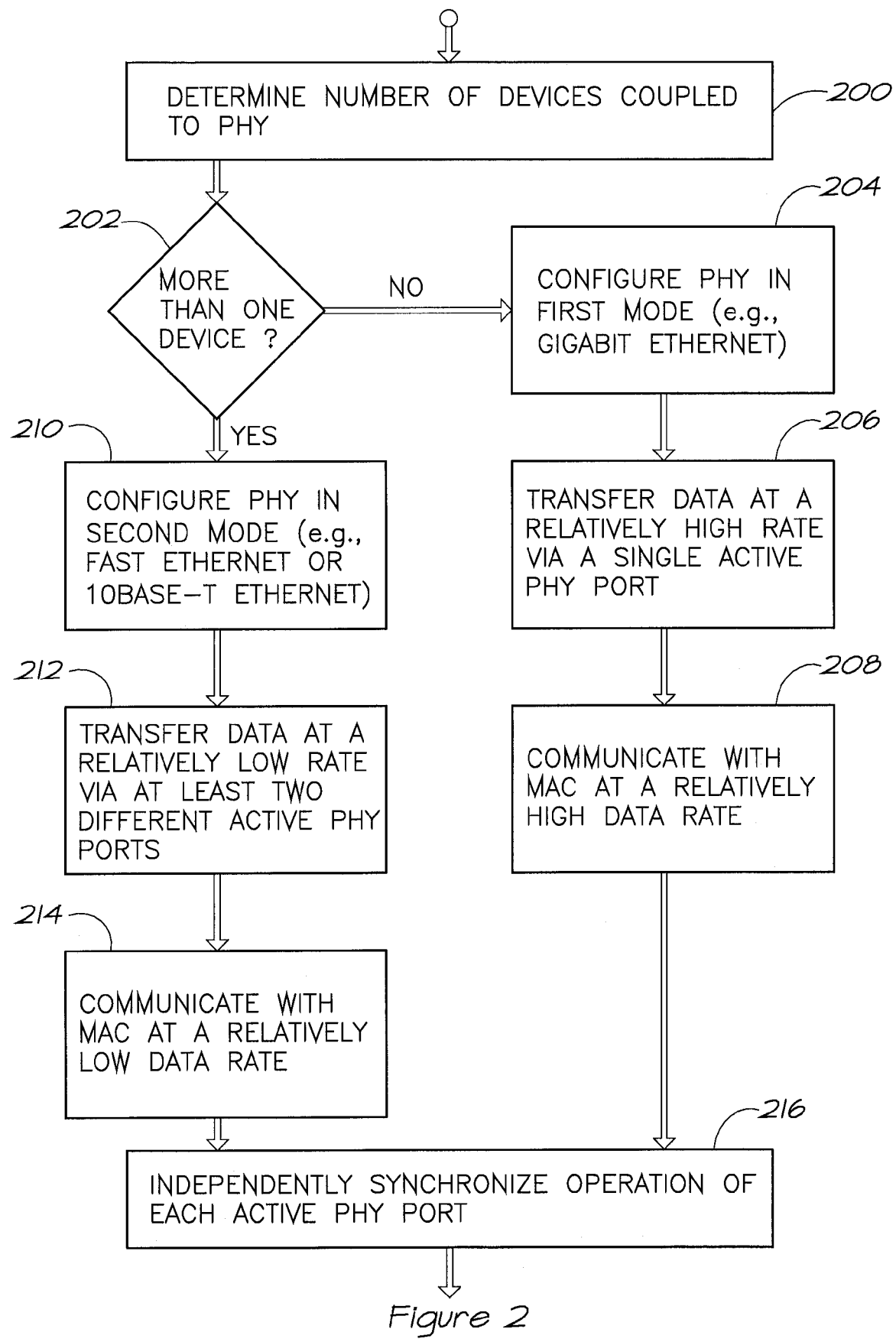
FIG. 2 is a logic flow diagram of an embodiment of processing logic for operating an Ethernet transceiver.

In each of these embodiments, the Ethernet transceiver 100 is configured in a first mode when a single far end device is coupled to the link interface 104, e.g., as illustrated by Step 204 of FIG. 2. The far end device may be coupled to the transceiver 100 via a relatively high-capacity cable 102 (e.g., 1000 Mbps or less). Accordingly, the transceiver 100 is configured in Gigabit Ethernet mode or below. Each transmit and receive section 114 of the transceiver 100 is operated concurrently to provide full-duplex operation at 1000 Mbps or greater when the transceiver 100 is configured in Gigabit Ethernet mode or above, e.g., as illustrated by Step 206 of FIG. 2. In this configuration, the port configuration logic 116 segments the link interface 104 into a single active data port coupled to the high-performance far end device. The PCS sublayer logic 112 also communicates with the MAC 110 at a relatively high data rate such as 1000 Mbps or greater when the transceiver 100 is configured in Gigabit Ethernet mode or above, e.g., as illustrated by Step 208 of FIG. 2.

The Ethernet transceiver 100 is configured in a different mode when multiple far end devices are coupled to the link interface 104, e.g., as illustrated by Step 210 of FIG. 2. In one embodiment, each far end device is coupled to the transceiver 100 via a relatively low-capacity cable 102 (e.g., less than 1000 Mbps). Alternatively, two far end devices can share the same cable 102. In one embodiment, two twisted-pair links of a CAT-5 or better cable 102 are coupled to one far end device while the other two twisted-pair links of the same cable 102 are coupled to a second far end device. In either cabling embodiment, the transceiver 100 is configured in a sub-Gigabit Ethernet mode. In one embodiment, the transceiver 100 is configured in Fast Ethernet mode when the far end device (or cabling) capacity limits performance below 1000 Mbps, but above 10 Mbps. The transceiver 100 is configured in 10Base-T Ethernet mode when the far end device (or cabling) capacity is below 100 Mbps. In either capacity embodiment, the transmit and receive circuit sections 114 of the transceiver 100 are logically divided by the port configuration logic 116 into at least two different groups, each group being associated with a different one of the far end devices.

The port configuration logic 116 also logically segments the link interface 104 into at least two different active data ports. This way, each far end device can be coupled to a different data port of the same transceiver 100 when the transceiver 100 is configured in a sub-Gigabit Ethernet mode. Each group of transmit and receive sections 114 operates at a relatively low data rate such as 100 Mbps when the transceiver 100 is configured in Fast Ethernet mode or 10 Mbps when the transceiver 100 is configured in 10Base-T Ethernet mode, e.g., as illustrated by Step 212 of FIG. 2. The PCS sublayer logic 112 also has at least two different sections, each section being associated with one of the sub-Gigabit data ports. This way, each section of the PCS logic 112 can independently communicate with the MAC 110 at a relatively low data rate, e.g., as illustrated by Step 214 of FIG. 2.

As such, the Ethernet transceiver 100 can communicate with a single high-performance far end device via a single fast data communication port (e.g., 1000 Mbps or less). Alternatively, the same transceiver 100 can communicate with at least two different lower-performance far end devices via a plurality of slower data communication ports (e.g., 100 Mbps or below). In both configurations, the transceiver 100 includes clock circuitry 118 for independently synchronizing operation of each active port of the link interface 104. When a single far end device is coupled to the transceiver 100, the clock circuitry 118 controls the frequency and phase of all transmit and receive circuit sections 114 based on a clock signal recovered from data received via the single active port. However, the transceiver 100 is coupled to more than one far end device when configured in the second mode. As such, the link interface 104 provides at least two different active data ports, each coupled to a different far end device. The clock circuitry 118 recovers a clock signal from data received via each of the active ports. The clock circuitry 118 uses each recovered clock signal to independently control the frequency and phase of the transmit and receive circuit sections 114 coupled to active ports of the link interface 104. This way, the transceiver 100 can provide port connectivity to multiple far end devices while maintaining proper synchronization with each far end device.

Figure 3:
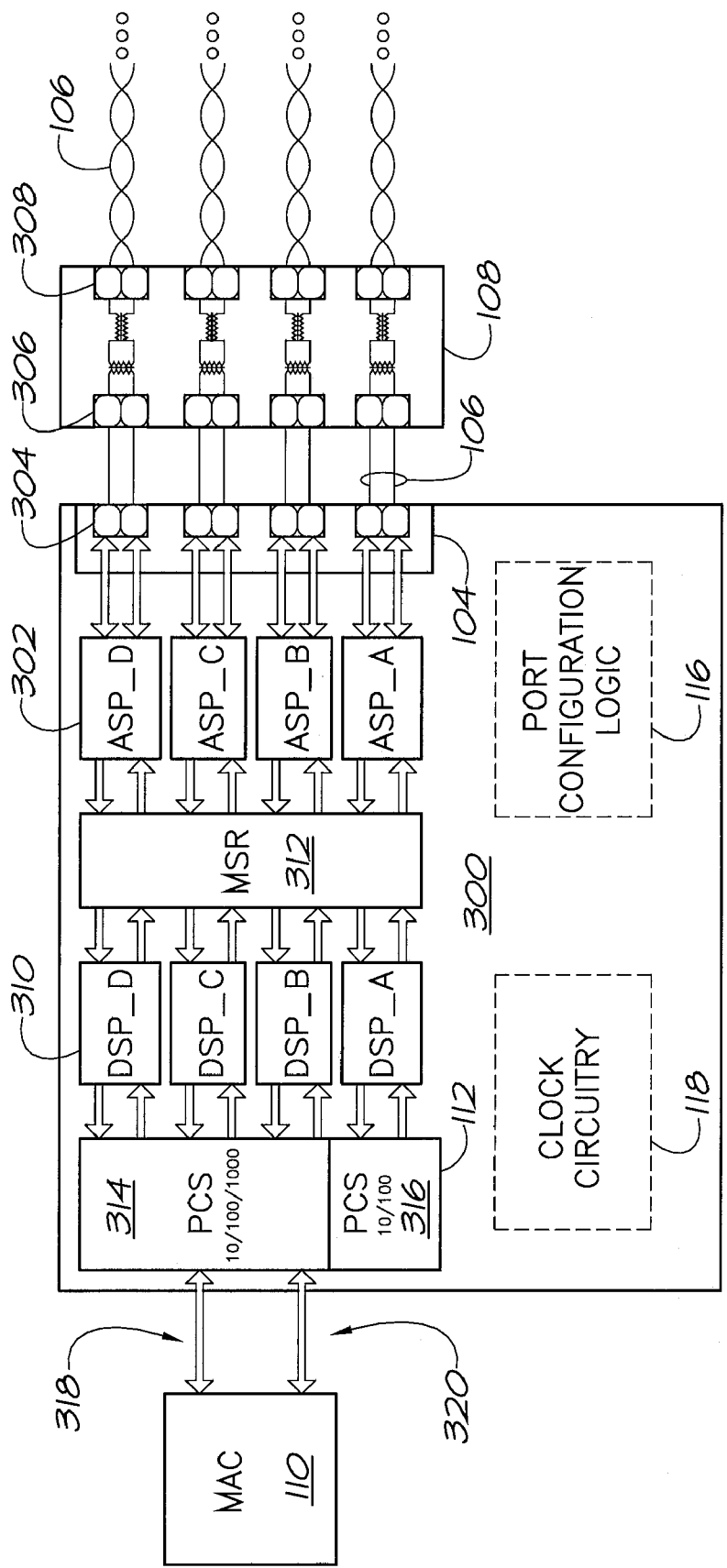
FIG. 3 is a block diagram of another embodiment of an Ethernet transceiver.

FIG. 3 illustrates an embodiment of the Ethernet transceiver 100. According to this embodiment, a PHY entity 300 controls the physical layer signaling. The PHY 300 includes an analog signal processor (ASP) 302 coupled to each physical layer I/O (input/output) 304 of the link interface 104. Each physical layer I/O 304 is also electromagnetically coupled to an I/O 306 of a respective one of a plurality of transformers 108. The other end of each transformer 108 has I/Os 308 for connecting to twisted-pair links 106 of one or more cables 102. Each ASP 302 is coupled to a corresponding digital signal processor (DSP) 310 via a media signal router (MSR) 312 that functions as a multiplexer. As such, each DSP 310 can be multiplexed to any one of the ASPs 302 and vice-versa. Each ASP 302/DSP 310 combination forms one of the transmit and receive sections 114 of the PHY 300. In one embodiment, the PHY 300 includes four transmit and receive sections 114 for providing gigabit Ethernet performance. The DSPs 310 perform functions like PMA (physical medium attachment) framing, octet synchronization and detection, and scrambling/descrambling. The ASPs 302 enable the physical signaling interface with the copper cabling 102. The ASPs 302 and DSPs 310 may include digital adaptive equalizers, encoders, decoders, echo cancellers, crosstalk cancellers, phase lock loop(s), line drivers, etc. and any accompanying support circuitry. The PCS logic 112 included in the PHY 300 performs coding such as Trellis/Convolutional coding and auto-negotiation.

During operation, the PHY 300 may be coupled to a single far end device (not shown) or multiple far end devices (not shown) as described above. The port configuration logic 116 logically segments the link interface 104 into enough active data communication ports to support each far end device coupled to the PHY 300. This way, the same PHY 300 can communicate with a single far end device or several far end devices. According to the embodiment shown in FIG. 3, a single far end device (not shown) is coupled to the PHY 300. As such, the link interface 104 is logically segmented into a single active data communication port where each I/O 304 of the link interface 104 is coupled to a respective twisted-pair link 106 of the cabling 102 coupled to the PHY 300. The port configuration logic 116 also ensures that the different ASP 302/DSP 310 sections operate concurrently to support the single data port at Gigabit Ethernet performance or above.

In this mode wherein all I/Os 304 concurrently support a single data, the port configuration logic 116 activates a first section 314 of the PCS logic 112 and deactivates a second section 316 of the PCS logic 112. The activated PCS section 314 functions at a relatively high data rate (e.g., 1000 Mbps or above) and can also operate at slower data rates such as Fast Ethernet and 10Base-T Ethernet. Thus, the first PCS section 314 can accommodate any type of far end Ethernet device coupled to the PHY 300. The first PCS section 314 receives layer-2 data frames from the MAC 110 over a first media independent interface 318 such as an MII (Media Independent Interface) or GMII (gigabit MII) interface. The first PCS section 314 codes the frames into data symbols. The encoded data symbols are transmitted at a rate negotiated with the far end device. The data rate is set to 1000 Mbps or above when the far end device and cabling 102 support Gigabit Ethernet performance or higher. Accordingly, all four ASP 302/DSP 310 sections are active. The data rate is reduced, e.g., to Fast Ethernet or 10Base-T Ethernet rates when either the cabling 102 or far end device cannot accommodate at least Gigabit Ethernet performance. Accordingly, less than four of the ASP 302/DSP 310 sections may be active. The encoded data symbols are then transmitted to the far end device via the single active port provided by the link interface 104.

Figure 4:
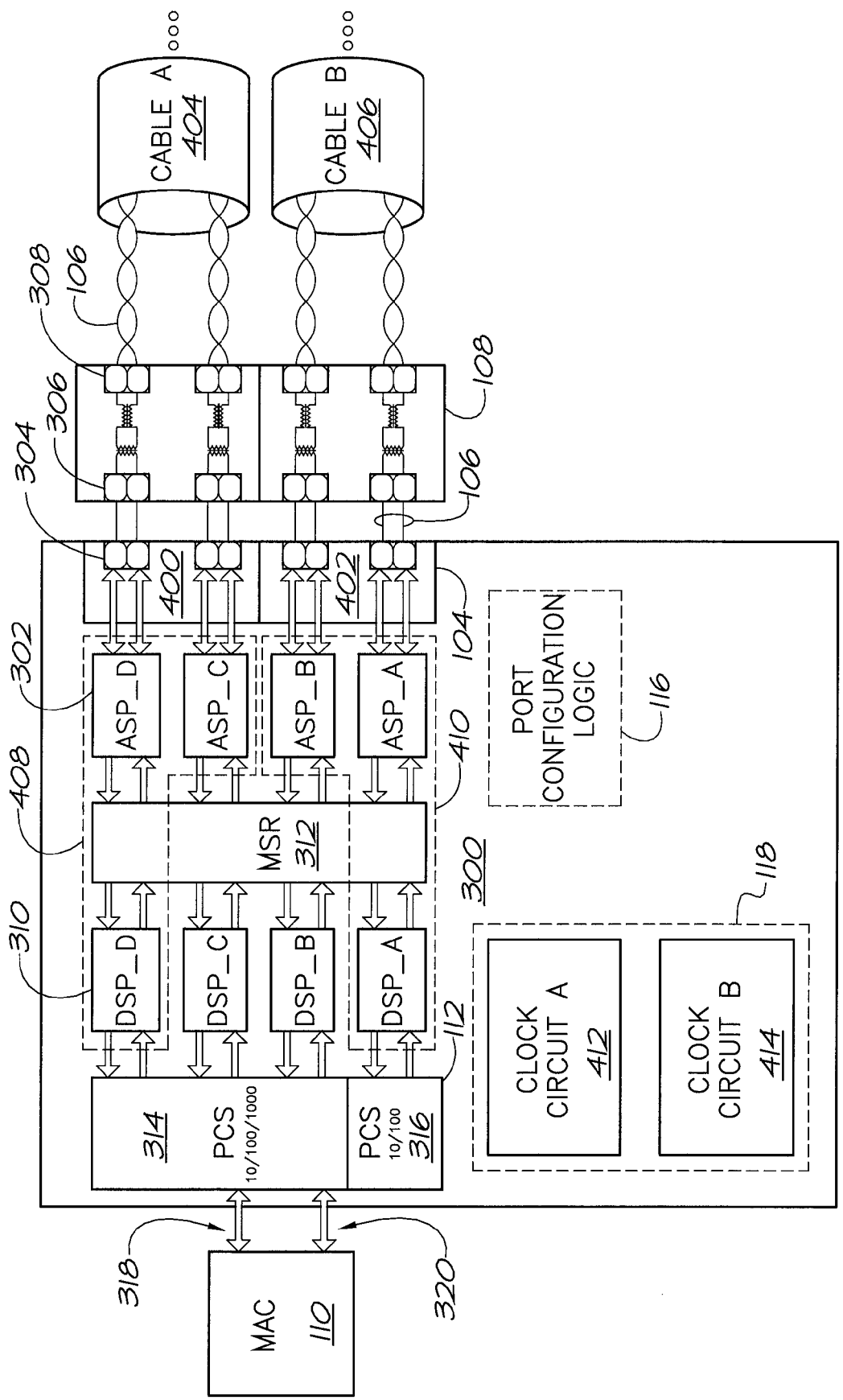
FIG. 4 is a block diagram of yet another embodiment of an Ethernet transceiver.

Alternatively, the PHY 300 may be coupled to at least two different far end devices (not shown) as described above and as illustrated in FIG. 4. The port configuration logic 116 logically segments the link interface 104 into a different active data communication port 400, 402 for each far end device coupled to the PHY 300. This way, several far end devices can communicate with the same PHY 300. According to the embodiment shown in FIG. 4, two far end devices (not shown) are coupled to the PHY 300. As such, the link interface 104 is logically segmented by the port configuration logic 116 into two active data communication ports 400, 402 where two I/Os 304 of the link interface 104 are coupled to two twisted-pair links 106 of a first cable 404 and the other two I/Os 402 of the link interface 104 are coupled to two twisted-pair links 106 of a second cable 406. Each cable 404, 406 is connected to a different one of the far end devices. Alternatively, the two far end devices share the same cable 102 where two twisted-pair links 106 of the cable are coupled to the first two I/Os 304 of the link interface 104 (first port) and the other two twisted-pair links 106 are coupled to the other two I/Os 304 of the link interface 104 (second port). In either embodiment, the port configuration logic 116 also arranges the ASP 302/DSP 310 sections into two different groups 408, 410. A first group 408 of the ASP 302/DSP 310 sections is coupled to the first active data port 400 and services the first far end device. A second group 410 of the ASP 302/DSP 310 sections is coupled to the second active data port 402 and services the second far end device. In one embodiment, each ASP/DSP group 408, 410 includes two ASPs 302 and a single DSP 310. The unused DSPs 310 can be deactivated to save power.

In the second mode, the port configuration logic 116 also associates the first PCS section 314 with the first ASP/DSP group 308 and the first data port 400 and associates the second PCS section 316 with the second ASP/DSP group 410 and the second data port 402. In one embodiment, the second PCS section 316 supports Fast Ethernet and 10Base-T Ethernet if the PHY 300 cannot support Gigabit Ethernet performance or higher when coupled to more than one far end device because the ASP 302/DSP 310 sections are divided between multiple far end devices. Broadly, each PCS logic section 314, 316 can support any desired data rate.

The second PCS section 316 communicates with the MAC 110 over a second media-independent interface 320. This way, the MAC 110 can independently communicate with both PCS sections 314, 316 when more than one far end device is coupled to the PHY 300. The MAC 110 sends data frames destined for the first far end device to the first PCS section 314 over the first media-independent interface 318 and sends data frames destined for the second far end device to the second PCS section 316 over the second media-independent interface 320. Each PCS section 314, 316 independently codes the respective frames into data symbols. The first group 408 of ASP 302/DSP 310 sections transmits data symbols received from the first PCS section 314 to the first far end device via the first active data port 400 at a relatively low data rate, e.g., at Fast Ethernet or 10Base-T Ethernet rates. The second group 410 of ASP 302/DSP 310 sections similarly transmits data symbols to the second far end device via the other active data port 402 of the link interface 104 also at a relatively low data rate. This way, the data processing capacity of the PHY 300 can be fully utilized regardless of whether one high-performance far end device is coupled to the PHY 300 via a single data port or multiple far end devices are coupled to the PHY via at least two different data ports.

Operation of the PHY 300 is synchronized as described above based on clock signals recovered from received data. According to the embodiment of FIG. 4, the clock circuitry 118 comprises a first clock circuit 412 for synchronizing operation of the first group 408 of ASP 302/DSP 310 sections and a second clock circuit 414 for synchronizing operation of the second group 410 of ASP 302/DSP 310 sections. The first and second clock circuits 412, 414 independently control the frequency and phase of the first and second ASP/DSP groups 408, 410, respectively. The first clock circuit 412 controls the frequency and phase of the first ASP/DSP group 408 based on a clock signal recovered from data received via the first active data port 400 of the link interface 104. The second clock circuit 414 similarly controls the frequency and phase of the second ASP/DSP group 410 based on a clock signal recovered from data received via the second active data port 402 of the link interface 104.

In one embodiment, each clock circuit 412, 414 comprises a voltage controlled oscillator. In another embodiment, each clock circuit 412, 414 comprises a fractional phase-locked loop. In yet another embodiment, each clock circuit 412, 414 comprises a digital sample rate converter that synchronizes operation of the respective active ports 400, 402 of the link interface 104. In each of these embodiments, by providing the independent clock circuits 412, 414, the clock circuitry 118 maintains proper PHY synchronization with each of the far end devices regardless of how many far end devices are coupled to the PHY 300.

Figure 5:
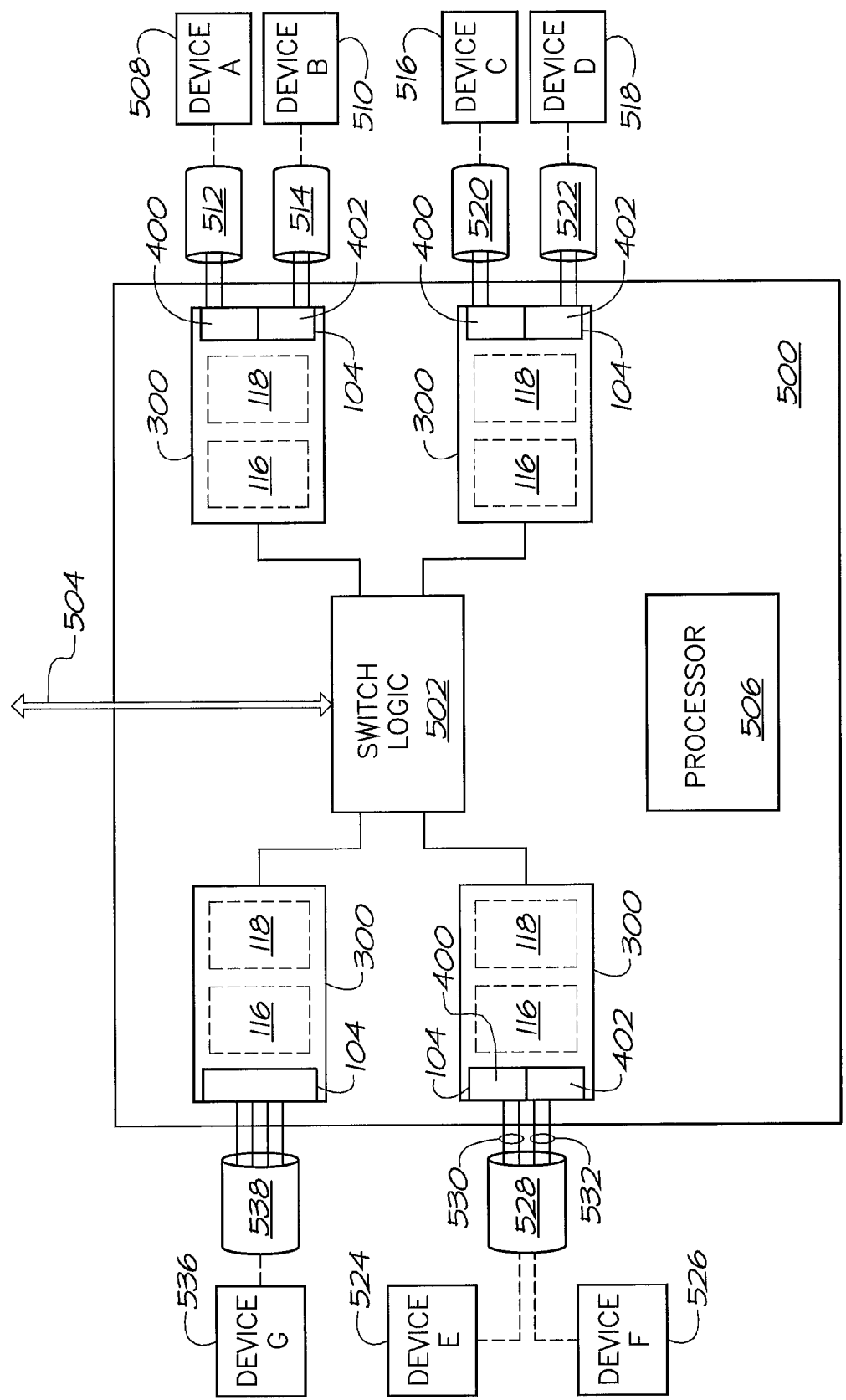
FIG. 5 is a block diagram of an embodiment of a network communication device including a plurality of Ethernet transceivers.

Multiple instances of the PHY 300 may be included in a network communication device such as an Ethernet switch or network adapter. FIG. 5 illustrates an embodiment of an Ethernet switch 500 including a plurality of the PHYs 300. Switch logic 502 controls the flow of data between an external interface 504 of the switch 500 and individual ones of the PHYs 300. A processor 506 manages overall operation of the switch 500. Any desired number of the PHYs 300 may be included in the switch 500. For ease of illustration and explanation only, four PHYs 300 are shown. Each PHY 300 is capable of communicating with one or more far end devices as described above. A first one of the PHYs 300 is coupled to two far end devices 508, 510, e.g., as illustrated by Step 600 of FIG. 6. As such, the link interface 104 of the first PHY 300 is logically segmented into two relatively low data rate ports 400, 402 by the port configuration logic 116. The first port 400 is coupled to the first far end device 508 via a first cable 512 and the second port 402 is coupled to the second far end device 510 via a different cable 514. A second one of the PHYs 300 also has two data ports 400, 402 coupled to two far end devices 516, 518 via two separate cables 520, 522, respectively, e.g., as illustrated by Step 600 of FIG. 6.

Figure 6:
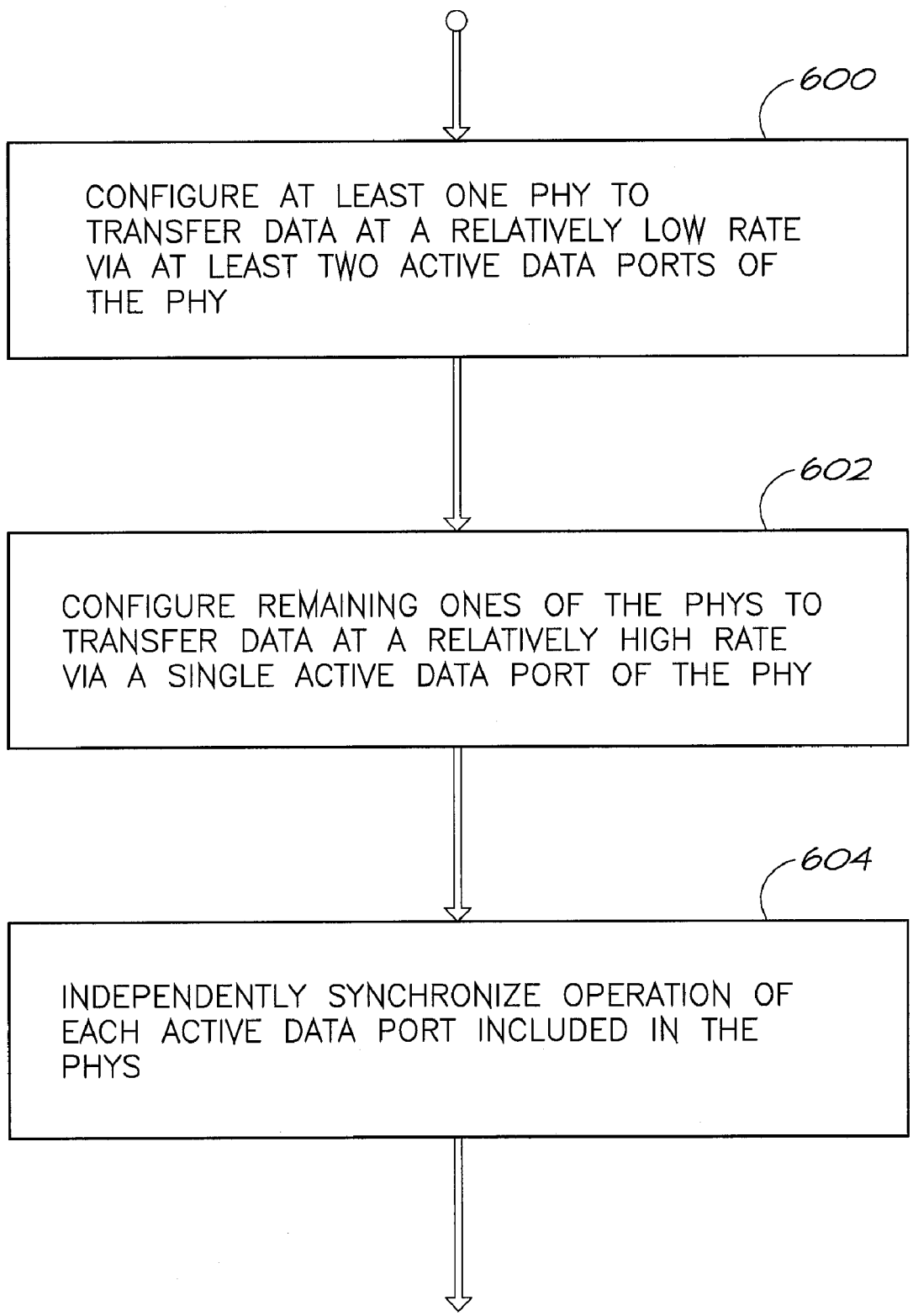
FIG. 6 is a logic flow diagram of an embodiment of processing logic for operating a network communication device including a plurality of Ethernet transceivers.

A third one of the PHYs 300 is similarly coupled to two far end devices 524, 526, e.g., as illustrated by Step 600 of FIG. 6. However, the far end devices 524, 526 coupled to the third PHY 300 share the same cable 528. That is, two twisted-pair links 530 of the shard cable 528 couple the first far end device 524 to a first data port 400 of the link interface 104. Two other twisted-pair links 532 of the same cable 528 couple the other far end device 526 to a second port 402 of the link interface 104. The third PHY 300 independently communicates with both far end devices 524, 526 over the same cable 528 as described above.

A fourth one of the PHYs 300 is coupled to a single far end device 536, e.g., as illustrated by Step 602 of FIG. 6. As such, the link interface 104 of the fourth PHY 300 is logically segmented into one relatively high data rate port by the port configuration logic 116. The high-performance port is coupled to the far end device 536 via a twisted-pair cable 538 or a fiber optic cable (not shown). The clock circuitry 118 included in each of the PHYs 300 independently synchronizes operation of the respective active PHY data ports 400, 402 based on a clock signal recovered from data received from each far end device 508, 510, 516, 518, 524, 536, 536 coupled to the PHYs 300 as described above.

Figure 7:
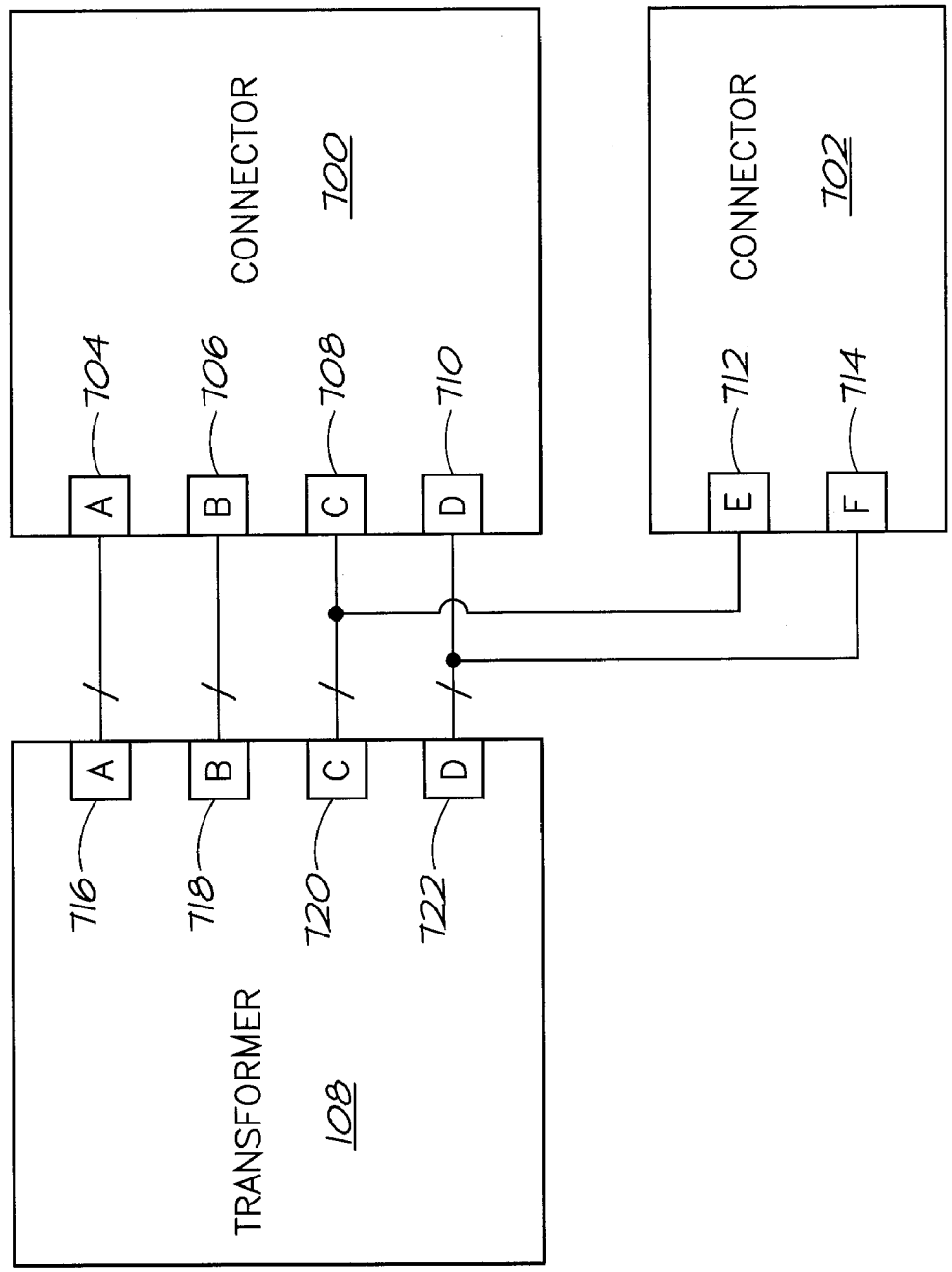
FIG. 7 is a block diagram of an embodiment of the physical connection interface between an Ethernet transceiver and cabling connected to the transceiver.

FIG. 7 illustrates an embodiment of the physical connection interface between the Ethernet transceiver 100 and the cabling 102 connected to the transceiver 100. According to this embodiment, two cable connectors 700, 702 are coupled to the transformer 108. In a first mode, the first connector 700 is used for single 10/100/1000 Mbps operation (or higher) and the second connector is not active. In a second mode, both connectors 700, 702 are active and 10/100 Mbps operation is provided via each connector 700, 702. In more detail, the first connector 700 has four I/O (input/output) ports 704-710 and the second connector has two I/O ports 712-714. In the first mode, either all four I/O ports 704-710 of the first connector 700 are active and connected to four respective I/O ports 716-722 of the transformer 108 for enabling 1000 Mbps operation or two of the ports 704-706 are active and connected to two respective transformer ports 716-718 for enabling 10/100 Mbps operation. In the second mode, two of the first connector I/O ports 704-706 are connected to two of the transformer I/O ports 716-718, respectively, for enabling 10/100 Mbps operation via the first connector 700. The two I/O ports 712-714 of the second connector 702 are similarly coupled to the remaining two I/O ports 720-722 of the transformer 108 also for enabling 10/100 Mbs operation via the second connector 702. This way, either a single 10/100/1000 Mbps (or higher) connection is provided to the Ethernet transceiver 100 when the first connector 700 is active or two different 10/100 Mbps connections are provided when both connectors 700, 702 are active.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An Ethernet physical interface transceiver, comprising:
a link interface configured to provide one or more active ports;
first circuitry configured to transfer data at a first rate via a single active port of the link interface when the transceiver is configured in a first mode and at a second rate lower than the first rate via at least two different active ports of the link interface when the transceiver is configured in a second mode;
second circuitry configured to communicate with a media access controller at a first data rate when the transceiver is configured in the first mode and at a second data rate lower than the first data rate when the transceiver is configured in the second mode; and
clock circuitry configured to independently synchronize operation of each active port of the link interface.

2. The physical interface transceiver of claim 1, wherein the first circuitry is configured to transfer the data at a gigabit Ethernet data rate or greater via the single active port when the transceiver is configured in the first mode and at a Fast Ethernet or 10Base-T Ethernet data rate via the at least two different active ports when the transceiver is configured in the second mode.

3. The physical interface transceiver of claim 1, wherein the first circuitry comprises a plurality of transmit-receive sections coupled to the single active port when the transceiver is configured in the first mode and wherein a first one of the transmit-receive sections is coupled to a first active port of the link interface and a second one of the transmit-receive sections is coupled to a second active port of the link interface when the transceiver is configured in the second mode.

4. The physical interface transceiver of claim 3, wherein the clock circuitry is configured to independently control the frequency and phase of each transmit-receive section coupled to a different active port of the link interface.

5. The physical interface transceiver of claim 4, wherein the clock circuitry is configured to independently control the frequency and phase of each transmit-receive section coupled to a different active port of the link interface based on a clock signal recovered from data received via each of the active ports.

6. The physical interface transceiver of claim 1, wherein the link interface comprises a plurality of I/O ports, the link interface being configurable to provide in the first mode a single active port including a first group of I/O ports and in the second mode at least two active ports, a first one of the at least two active ports including a second group of I/O ports and a second one of the at least two active ports including a third group of I/O ports.

7. The physical interface transceiver of claim 1, wherein the clock circuitry comprises a digital sample rate converter configured to synchronize operation of each active port of the link interface.

8. The physical interface transceiver of claim 1, wherein the clock circuitry comprises a phase-locked loop configured to synchronize operation of each active port of the link interface.

9. The physical interface transceiver of claim 1, wherein the second circuitry is configured to communicate with the media access controller at the first data rate via a single media-independent interface when the transceiver is configured in the first mode and at the second data rate via at least two different media-independent interfaces when the transceiver is configured in the second mode.

10. An Ethernet physical interface transceiver, comprising:
a link interface configured to provide one or more active ports;
first circuitry configured to transfer data at a first rate via a single active port of the link interface when the transceiver is configured in a first mode and at a second rate lower than the first rate via at least two different active ports of the link interface when the transceiver is configured in a second mode;
second circuitry configured to communicate with a media access controller at a first data rate when the transceiver is configured in the first mode and at a second data rate lower than the first data rate when the transceiver is configured in the second mode; and
means for independently synchronizing operation of each active port of the link interface.

11. A method of operating an Ethernet physical interface transceiver, comprising:
configuring the transceiver in a first mode when a single device is coupled to the transceiver via a single active port and in a second mode when a plurality of devices are coupled to the transceiver via at least two different active ports;
transferring data at a first rate via the single active port when the transceiver is configured in the first mode and at a second rate lower than the first rate via the at least two different active ports when the transceiver is configured in the second mode;
communicating with a media access controller at a first data rate when the transceiver is configured in the first mode and at a second data rate lower than the first data rate when the transceiver is configured in the second mode; and
independently synchronizing operation of each active port of the transceiver.

12. The method of claim 11, wherein transferring the data comprises transferring the data at a gigabit Ethernet rate or greater via the single active port when the transceiver is configured in the first mode and at a Fast Ethernet or 10Base-T Ethernet rate via the at least two different active ports when the transceiver is configured in the second mode.

13. The method of claim 11, wherein transferring the data comprises:
coupling a plurality of transmit-receive circuit sections of the transceiver to the single active port when the transceiver is configured in the first mode; and
coupling a first one of the transmit-receive circuit sections to a first one of the active ports and a second one of the transmit-receive circuit sections to a second one of the active ports when the transceiver is configured in the second mode.

14. The method of claim 13, wherein independently synchronizing operation of each active port of the transceiver comprises independently controlling the frequency and phase of each transmit-receive circuit section coupled to a different one of the active ports.

15. The method of claim 14, wherein independently controlling the frequency and phase of each transmit-receive circuit section coupled to a different one of the active ports comprises independently controlling the frequency and phase of each transmit-receive circuit section coupled to a different one of the active ports based on a clock signal recovered from data received via each of the active ports.

16. The method of claim 11, wherein communicating with the media access controller comprises enabling a single media-independent interface when the transceiver is configured in the first mode and at least two different media-independent interfaces when the transceiver is configured in the second mode.

17. A network communication device, comprising:
a plurality of media access controllers;
a plurality of physical interface transceivers each coupled to at least one of the media access controllers; and
wherein at least one of the physical interface transceivers has at least two active data ports each configured to operate at a first data rate and the remaining physical interface transceivers each have a single active data port configured to operate at a second data rate higher than the first data rate.

18. The network communication device of claim 17, wherein each physical interface transceiver having the at least two active data ports comprises:
a link interface configured to provide one or more data ports;
first circuitry configured to transfer data at a first rate via a single active data port of the link interface when the transceiver is configured in a first mode and at a second rate lower than the first rate via at least two different active data ports of the link interface when the transceiver is configured in a second mode;
second circuitry configured to communicate with at least one of the media access controllers at a first data rate when the transceiver is configured in the first mode and at a second data rate lower than the first data rate when the transceiver is configured in the second mode; and
clock circuitry configured to independently synchronize operation of each active data port of the link interface.

19. The network communication device of claim 18, wherein the first circuitry comprises a plurality of transmit-receive sections coupled to the single active data port of the link interface when the transceiver is configured in the first mode and wherein a first one of the transmit-receive sections is coupled to a first active data port of the link interface and a second one of the transmit-receive sections is coupled to a second active data port of the link interface when the transceiver is configured in the second mode.

20. The network communication device of claim 19, wherein the clock circuitry is configured to independently control the frequency and phase of each transmit-receive section coupled to a different active data port of the link interface.

21. The network communication device of claim 20, wherein the clock circuitry is configured to independently control the frequency and phase of each transmit-receive section coupled to a different active data port of the link interface based on a clock signal recovered from data received via each active data port of the link interface.

22. The network communication device of claim 18, wherein the second circuitry is configured to communicate with at least one of the media access controllers at the first data rate via a single media-independent interface when the transceiver is configured in the first mode and at the second data rate via at least two different media-independent interfaces when the transceiver is configured in the second mode.

23. A method of operating a network communication device, comprising:
providing a plurality of media access controllers and a plurality of physical interface transceivers;
coupling each physical interface transceiver to at least one of the media access controllers;
configuring at least one of the physical interface transceivers to transfer data at a first rate via at least two active data ports included in the at least one physical interface transceiver;
configuring remaining ones of the physical interface transceivers to transfer data at a second rate higher than the first rate via a single active data port included in each of the remaining physical interface transceivers; and
independently synchronizing operation of each active data port included in the physical interface transceivers.

24. The method of claim 23, wherein configuring the at least one physical interface transceiver to transfer data at the first rate comprises:
coupling a first transmit-receive circuit section of the at least one physical interface transceiver to a first active data port of the at least one physical interface transceiver; and
coupling a second transmit-receive circuit section of the at least one physical interface transceiver to a second active data port of the at least one physical interface transceiver.

25. The method of claim 24, wherein independently synchronizing operation of each active data port included in the physical interface transceivers comprises independently controlling the frequency and phase of each transmit-receive circuit section coupled to a different active data port of the at least one physical interface transceiver.

* * * * *